(12) United States Patent
Fowler

(10) Patent No.: US 8,404,099 B2
(45) Date of Patent: Mar. 26, 2013

(54) ELECTROLYSIS OF SPENT FUEL POOL WATER FOR HYDROGEN GENERATION

(76) Inventor: David E. Fowler, Gainesville, FL (US)

( * ) Notice: Subject to any disclaimer, the term of this patent is extended or adjusted under 35 U.S.C. 154(b) by 696 days.

(21) Appl. No.: 12/552,469

(22) Filed: Sep. 2, 2009

(65) Prior Publication Data

US 2010/0072074 A1    Mar. 25, 2010

Related U.S. Application Data

(60) Provisional application No. 61/098,247, filed on Sep. 19, 2008.

(51) Int. Cl.
  *C25B 1/02* (2006.01)
  *C25B 3/00* (2006.01)
  *C25C 1/02* (2006.01)
(52) U.S. Cl. .................. 205/637; 205/628; 205/339
(58) Field of Classification Search .............. 205/339, 205/628–639; 204/664
  See application file for complete search history.

(56) References Cited

U.S. PATENT DOCUMENTS

| | | | | |
|---|---|---|---|---|
| 4,637,866 A | * | 1/1987 | Konishi et al. ............... 205/627 |
| 4,714,533 A | * | 12/1987 | Rahier et al. ................. 204/262 |
| 5,055,189 A | * | 10/1991 | Ito ................................. 210/222 |
| 5,451,322 A | * | 9/1995 | Nelson et al. ................. 210/653 |
| 6,968,028 B1 | * | 11/2005 | Puthawala ..................... 376/306 |
| 2005/0066541 A1 | * | 3/2005 | Singh ............................ 34/494 |
| 2007/0217995 A1 | | 9/2007 | Matsumura et al. |
| 2008/0047502 A1 | | 2/2008 | Morse |
| 2008/0137797 A1 | | 6/2008 | Peter |

OTHER PUBLICATIONS

Ghoroghchian, I; Bockris, J. Use of homopolar generator in hydrogen production from water. International Journal of Hydrogen Energy, vol. 10, p. 101-112 1985.*
Iida, T.; Matsushuma, H; Fukunaka, Y. Water electrolysis under magnetic field. Journal of the electrochemical society, 2007, E112-E115.*

* cited by examiner

*Primary Examiner* — Jonathan Johnson
*Assistant Examiner* — Brian W Cohen
(74) *Attorney, Agent, or Firm* — Saliwanchik, Lloyd & Eisenschenk

(57) ABSTRACT

A method for the electrolytic production of hydrogen where radiation excited water from a spent fuel pool of a nuclear power plant is delivered to one or more electrolysers where DC current is applied to pairs of electrodes in the electrolysers to form hydrogen and oxygen. The hydrogen is collected. The collection of hydrogen can be carried out in a grid energy storage system to produce large quantities of hydrogen during low grid demand for electricity with little or no hydrogen during high grid electricity demand.

14 Claims, 1 Drawing Sheet

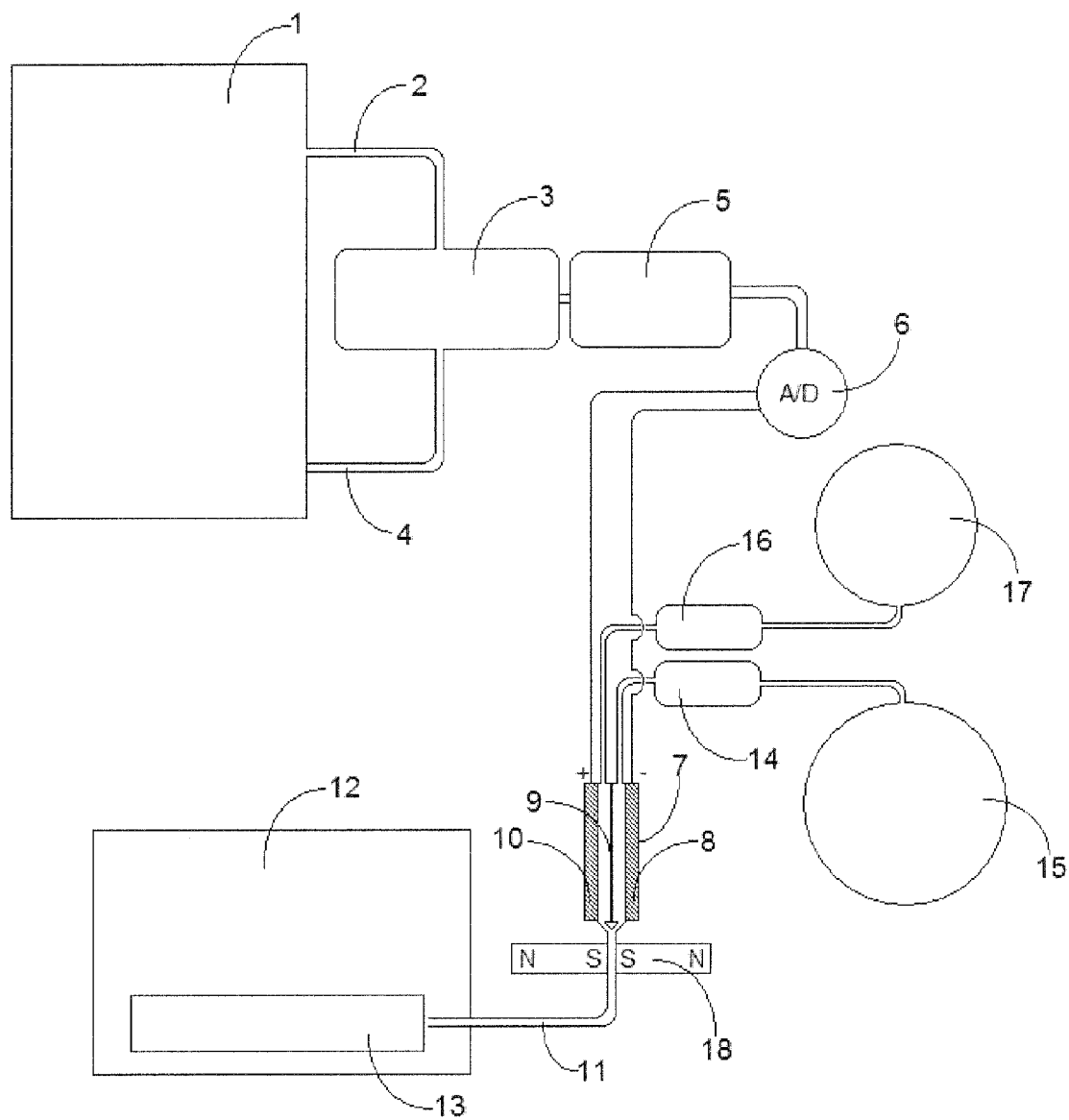

ELECTROLYSIS OF SPENT FUEL POOL WATER FOR HYDROGEN GENERATION

CROSS-REFERENCE TO RELATED APPLICATION

The present application claims the benefit of U.S. Provisional Application Ser. No. 61/098,247, filed Sep. 19, 2008, which is hereby incorporated by reference herein in its entirety, including any figures, tables, or drawings.

BACKGROUND OF THE INVENTION

Recently, it has been perceived that the earth is in a state of warming and it has been hypothesized that the cause of this warming is human activity. The primary human activity attributed to the warming condition is the burning of fossil fuels. The burning of fossil fuel produces carbon oxides, primarily carbon dioxide ($CO_2$), which is a most prevalent greenhouse gas, second only to water vapor. Data indicates that the $CO_2$ level has increased by about 100 ppm (from about 280 to about 380 ppm) since the beginning of the Industrial Revolution. Greenhouse gases are those gases present in the earth's atmosphere that attenuate the loss of heat into outer space, thereby affecting global temperatures. Although essential to maintaining habitable temperature, an excess of greenhouse gases can raise the temperature of a planet.

Because of the desire to avoid additional warming, treaties and various strategies have been constructed in an attempt to control the anthropogenic sources of $CO_2$. The efforts to maintain $CO_2$ levels contradict the needs of a growing population, particularly where a greater proportion of the population is becoming more technically advanced. In attempts to combat this problem, the use of alternate energy sources has been encouraged and subsidized to reduce $CO_2$ emissions. Although means such as solar, wind, geothermal, tidal, and hydroelectric sources do not generate greenhouse gas emissions, in many cases their reliability and accessibility do not allow dependence on such methods. An alternate method that does not generate $CO_2$ is nuclear energy, although numerous barriers to greater implementation in some parts of the world exist. Although reliable and accessible for many activities, direct uses of any of these non-emitting alternates may not be appropriate for modern transportation needs, for example automotive, where a fluid fuel remains desirable.

A fuel that does not generate carbon oxides is hydrogen. Upon its combustion, hydrogen forms only water. The goal of a hydrogen economy has been envisioned where much research has been directed to fuel cells, storage systems, distribution networks and generation. Presently, hydrogen generation is considered by many to be cost ineffective. At the present time, hydrogen is most economically produced from hydrocarbons, where hydrogen can be generated from natural gas at approximately 80% efficiency. A primary or exclusive step is the steam reforming of natural gas where steam ($H_2O$) reacts endothermically with methane ($CH_4$) to yield $H_2$ and carbon monoxide CO at high temperatures (700-1100° C.) which are generated by the burning of natural gas. Generally in a subsequent step additional hydrogen is recovered by the exothermic water gas shift reaction where the CO from the steam reforming process undergoes transformation at about 130° C. to produce $H_2$ and $CO_2$. Hence, hydrogen generation in this manner can generate more $CO_2$ than does directly using the natural gas as a fuel. Hydrogen can also be formed biochemically, but prototype reactors using sulfur deprived algae reactors have produced hydrogen at only 7 to 10% efficiencies.

Direct electrolysis of water can produce hydrogen with efficiencies of about 25% without the formation of greenhouse gases. However, the electricity consumed is typically more valuable than the hydrogen produced and this mode of generation is not widely used. The electrolysis at very high temperatures has been carried out at the laboratory scale where the efficiency of electrolysis is increased to about 50%. The high temperature electrolysis (HTE) process is generally considered to be viable by combination with a nuclear heat source, as other non-chemically generated high-temperature heat sources are not considered consistent enough to justify the capital costs of HTE equipment. Even using nuclear heat sources, only prototype Generation IV nuclear reactors can operate at the temperatures (859 to 1,000° C.) identified for economical hydrogen production. No Generation IV nuclear reactors are anticipated before the year 2030. Hence, a sufficiently efficient generation of hydrogen without generation of carbon oxides is not anticipated to be economical for at least twenty years.

SUMMARY OF THE INVENTION

One embodiment of the invention is a method for producing hydrogen from radiation excited water from one or more spent fuel pools, typically residing at a nuclear power plant, to at least one electrolyser where a DC electrical current is applied to at least one pair of electrodes of each of the electrolysers and the hydrogen is collected. Radiation excited water can be drawn from the proximity of the spent fuel cells residing in the spent fuel pool, or other source of radiation excited water at the site of a nuclear power plant. Any type of electrolyser can be used individually or in combination, including, but not restricted to, alkaline electrolysers, proton exchange membrane (PEM) electrolysers, alkaline ionomer based electrolysers, and solid oxide electrolysers. The DC current can be converted from the AC current generated by an AC generator coupled to the turbine of the nuclear power plant, or the steam can be diverted from a turbine driving an AC generator to a turbine driving a DC generator. The A to D conversion can occur by employing an AC driven motor to turn shafts of one or more homopolar generators. The hydrogen produced at the cathodes within the electrolysers can be collected as a high pressure gas, absorbed or converted into a hydride or other hydrogen equivalent. The oxygen produced at anodes of the electrolysers can be collected as a high pressure gas or a liquid.

In another embodiment of the invention the radiation excited water can be passed through at least one magnetic field situated before the entrance of the electrolysers. A high magnetic flux can be created by directing like poles of one or more sets of magnets, either permanent or electromagnets, toward each other.

In another embodiment of the invention a grid energy storage system for load leveling of a nuclear power plant is carried out by producing hydrogen and oxygen. During periods of low grid electricity demand, electricity is diverted from the grid to one or more electrolyser where radiation excited water from spent fuel pools undergoes electrolysis in at least one electrolyser and storing the hydrogen as a combustion source of energy. The combustion can be reintroduced to the grid or used remotely to the gird. During periods of high grid electricity demand, some or all of the power supplied to the electrolysers can be diverted to the gird.

BRIEF DESCRIPTION OF THE FIGURE

FIG. 1 is a schematic drawing of a grid energy storage system for a nuclear power plant employing energy stored as hydrogen by electrolysis of radiation excited water from a spent fuel pool.

DETAILED DESCRIPTION OF THE INVENTION

Hydrogen can be produced by electrolysis in a more cost efficient manner if energy in addition to electrical energy is supplied to the water. In embodiments of the invention, the source of non-electrical energy is radiant energy from spent fuel rods submerged in water pools, known as spent fuel pools. The water of the pool that is in an excited state from absorption of the radiant energy is exposed to the electrodes for electrolysis to enhance hydrogen generation at the cathode. Spent fuel pools receive the spent fuel rods from nuclear reactors. Spent fuel pools require at least 20 feet of water over the stored fuel rods to provide a safety margin and allow fuel assembly manipulation without special shielding protecting the operators. A typically pool is about 40 feet or more in depth where the bottom approximate 14 feet are equipped with storage racks designed to hold fuel assemblies from the reactor. These fuel pools are generally situated at the reactor site where electricity is generated. In many case, the fuel assemblies are stored underwater for 10 to 20 years before being sent for reprocessing or dry cask storage. Presently, the water is used only to cool the fuel and provide shielding from radiation. The maintenance of spent fuel pools is an added cost to the generation of electrical energy in a nuclear power plant. Although it is envisioned that, presently, it appears that the spent fuel pools will typically reside at the nuclear power plant where the spent fuel is generated for reasons including regulations on transport, convenience of handling and security, the spent fuel rods can be transported to an off-plant facility for hydrogen generation.

Although characterized by the blue glow due to Čerenkov radiation, the spent fuel pools also excite water, where sufficient energy results in radiolysis of water to form hydronium ions, electrons, hydroxide radicals, hydrogen radicals, hydrogen peroxide, and hydrogen. The rate of hydrogen production is governed by the rate of energy absorption from bombardment with gamma rays, neutrons, and alpha particles. A state of dynamic equilibrium is established with a low level of $H_2$ present in the pool as hydrogen is consumed by a number of pathways. Additionally, a large proportion of the Čerenkov radiation is ultraviolet radiation, which can excite the water to the first absorption band for an isolated water molecule at 7.5 eV where dissociation into H and OH radicals occurs. This absorption is shifted to 8.3 eV in a liquid environment, and a two photon excitation at 9.2 eV yield relatively equal quantities of dissociation and ionization. In one embodiment of the invention, the excited water in spent fuel rod containment pools is electrolyzed. Excited water can be electrolyzed with an increased rate and efficiency of hydrogen production.

In embodiments of the invention, the electrolysis is carried out using the water of the spent fuel pool such that the water in an excited state is electrolyzed. As referred to herein, the source of the radiation excited water is referred to as that from the spent fuel pool. Although the spent fuel pool is an accessible source of the radiation excited water relative to that from other portions of a nuclear power plant, radiation excited water from other portions of a nuclear power system may be employed as that from the "spent fuel pool" and is herein considered radiation excited water from a spent fuel pool. The energy from the spent fuel rods is typically simply dissipated in a non-harmful manner and costs for the storage is not captured in any fashion. Using this spent fuel pool water reduces the electrical energy required for the production of an equivalent quantity of hydrogen and its by-product oxygen relative to water that has not been excited. The oxygen produced in this manner is an alternate route to oxygen production in addition to cryogenic air separation and vacuum pressure swing adsorption processes that currently dominate oxygen production. The cogeneration of oxygen constitutes an additional product of value to reduce the cost of producing hydrogen by electrolysis. Where hydrogen combustion is used for energy release for any purpose, the oxygen by-product can be employed if desired.

The electrolysis apparatus, the electrolysers, can be of any design, including alkaline electrolysers, proton exchange membrane (PEM) electrolysers, alkaline ionomer based electrolysers, or even solid oxide electrolyzers where heat from the reactor is also employed for the production of hydrogen. In one embodiment, the electrodes are powered by the electricity generated by the nuclear power plant that has the spent fuel pool on site. In other embodiments, the power can be from electrical generation facilities other than or in addition to the nuclear power plant that provides the spent fuel rods. For example, the electricity can be generated by wind, geothermal, solar, hydroelectric, tidal, or any other mode, and can be a facility that exclusively generates electricity for the electrolysis process. The other electrical power source can be used in combination with the electrical power generated at a nuclear power plant. In some embodiments the generator can generate a DC current that is directly provided to the electrolysers. In one embodiment of the invention, the production of hydrogen permits the electrical power to be more efficiently produced by a grid energy storage system. Energy is stored as hydrogen and oxygen during low power demand periods and little or no hydrogen and oxygen are produced when demand of the grid is high. During periods of low power consumption by grid consumers (e.g., during the middle of the night), electrical power is diverted from the grid to hydrogen and oxygen production, whereas less power is diverted to hydrogen and oxygen production during periods of high power demand by the grid consumers. Such load leveling increases the efficiency of the power generation relative to when the level of power output fluctuates to a large degree. Hence, when high power demands occur, little hydrogen, if any, need be produced while large quantities of hydrogen can be produced when the electricity demand of the grid supplied by the power plant is low. Unlike the typical grid energy storage systems that produce stored energy during low load for co-electricity generation during high load, the hydrogen can be used additionally or exclusively as a source of energy that can be used in applications that are remote to the site of generation. The enhanced efficiency in running the nuclear power plant further decreases the cost of hydrogen production in addition to the reduction in electrical energy required to form the hydrogen because the water has been excited by the radiation from the stored spent fuel rods.

In an embodiment of the invention, the water is drawn from a position in the spent fuel pool adjacent to the spent fuel rods where a relatively high proportion of water exists in an excited state. The water can be drawn as needed into at least one electrolyser. The water can be drawn in a controlled manner via a pump, gravity, or even a siphon. The electrolyser can be situated in close proximity to the pooh or even in the pool, and a high rate of flow can be used such that minimal decay from the excited state has occurred to the water being delivered to the cells of the electrolysers for electrolysis. The water drawn from this portion of the spent fuel pool will be warm, which is also favorable to the efficient generation of hydrogen and oxygen by electrolysis.

The electrolyser can contain any number of electrolysis cells. Most materials commonly used as electrodes, membranes and housing can be employed. The appropriateness of any material can be readily tested in the spent fuel pool or a facsimile thereof prior to use in the electrolyser. The DC electrical power needed for the electrolysis cells can be relatively low voltage, but high current is required for high rates of hydrogen generation. The AC electricity typically generated by the generators coupled to the turbines of the nuclear power plants can be converted to DC electricity using traditional means, generally using transformers and rectifiers, or using non-traditional means, such as powering the rotating shaft and any electromagnets used in a one or more homopolar generator to produce a low voltage high current DC used for electrolysis. Alternately, steam may be diverted from the turbine coupled to the AC generator to a turbine coupled to a DC generator. The most efficient means can be determined for any given nuclear power plant by calculations and, if needed, experimentation by those skilled in the art.

In another embodiment of the invention, the radiation excited water can be passed through a magnetic field immediately before introduction to the electrodes of the electrolyser. Magnetic fields can affect the hydrogen bonding aggregate structure of the water, modifying properties, for example surface tension, which, for example, can enhance the wetting of electrodes, and further increasing the efficiency of electrolysis. For example, a set of magnets, where each set is a plurality of magnets, can be incorporated at the entrance to electrolyzers or each electrolysis cell within an electrolyser. The magnets can be situated such that like poles of the magnet are directed toward each other where the excited water is passed through this high magnetic flux. The magnets can be permanent or electromagnets. The magnetic field can be high, for example, 5,000 gauss or greater. In this manner, with little or no additional power, the efficiency of the electrolysis of the excited water can be further enhanced.

The specific design of the electrolysis system can vary from one nuclear power plant to another, and systems designed to retrofit an existing power plant is anticipated to vary from the design for a new plant where an electrolysis system is included in the construction design. FIG. 1 is a basic scheme of an electrolysis system according to one embodiment of the invention using water from the spent fuel pool of a nuclear power plant. In FIG. 1, a nuclear reactor within containment 1, which houses the reactor and a steam generator, is coupled to a steam line 2 to a turbine 3 with a return line 4 returning a condensate to the steam generator. The turbine 3 turns the shaft of a generator 5, which in most plants generates AC current. A converter 6 can be used to generate a DC current where an electrolyser 7 is shown as a single electrolysis cell with a cathode 8, where hydrogen is generated, separated by a membrane 9 from an anode 10, where oxygen is generated. Though not shown, water can flow through the electrolysis cell and be returned to the spent fuel pool. The radiation excited water is drawn through a pipe 11 from the spent fuel pool 12 from the vicinity of the spent fuel rod assembly 13. The hydrogen generated at the cathode 8 can then be drawn to a hydrogen compressor 14, where the compressed hydrogen can be stored in a high pressure hydrogen containment vessel 15. Alternately or additionally the hydrogen can be collected and stored by an absorption process. Likewise, the oxygen generated at the anode can be drawn to an oxygen compressor 16 and stored in a high pressure oxygen containment vessel 17. The embodiment illustrated in FIG. 1 shows the use of an optional magnet assembly 18, showing a set as a single pair of magnets, that is situated at or in the pipe 11 through which the radiation excited water is delivered to the electrolyser 7 when passing through the flux generated by, as illustrated, the two south poles of the magnets directed toward each other. Although two south poles are directed toward each other in FIG. 1, in another embodiment of the invention, the two like poles can be two north poles.

The system illustrated in FIG. 1 shows critical portions of a hydrogen generating system according to an embodiment of the invention, but does not show many components that one of ordinary skill in the art would appreciate are generally included for effective operation of such a system. Components that are generally employed in a system include, but not limited to, valves, controllers and pumps. Other embodiments of the invention can be readily appreciated, including, but not limited to, those where: a generator directly generates DC current; multiple electrolysers are used with controllers to limit the number of working electrolysers and at what level the electrolysers are functioning; electrolysers with multiple electrolysis cells are employed that may have different designs of electrolysis cells; components are placed at different positions in the system, for example where the electrolysers are included in the spent fuel pool; and hydrogen storage is based on other means of storage than compression, such as absorption or chemical conversion into hydrides or other reactive hydrogen equivalents.

It should be understood that the examples and embodiments described herein are for illustrative purposes only and that various modifications or changes in light thereof will be suggested to persons skilled in the art and are to be included within the spirit and purview of this application.

I claim:

1. A method for the electrolytic production of hydrogen comprising:
   delivering radiation excited water from at least one spent fuel pool to at least one electrolyser; applying a DC electrical current to at least one pair of electrodes of each of said electrolysers wherein said hydrogen is produced; and
   collecting said hydrogen.

2. The method of claim 1, wherein said radiation excited water is drawn from a volume of said spent fuel pool proximal to spent fuel cells residing in said spent fuel pool.

3. The method of claim 1, wherein said at least one electrolyser comprises an alkaline electrolyser, a proton exchange membrane (PEM) electrolyser, an alkaline ionomer based electrolyser, a solid oxide electrolyser, or any combination thereof.

4. The method of claim 1, further comprising converting AC electrical current from said nuclear power plant to said DC electrical current by at least one rectifier, transformer, conditioner, or any combination thereof.

5. The method of claim 4, wherein said means of transforming said AC electrical current to said DC electrical current comprises at least one AC powered motor driving a shaft of at least one homopolar generator.

6. The method of claim 1, wherein said DC electrical current is generated by a DC generator of said nuclear power plant.

7. The method of claim 1, wherein said collecting comprises compressing said hydrogen gas into a high pressure containment vessel.

8. The method of claim 1 further comprises collecting coproduced oxygen.

9. The method of claim 8, wherein said collecting coproduced oxygen comprises compressing said oxygen gas into a high pressure containment vessel.

10. The method of claim 1, wherein said delivering comprises flowing said radiation excited water through at least one magnetic field situated before the entrance to said at least one electrolyser.

11. The method of claim 10, wherein said magnetic field is formed by at least one set of magnets having like poles of said set of magnets directed toward each other, wherein said flow passes between said like poles.

12. The method of claim 1, further comprising storing said hydrogen as a combustible source of energy, wherein said applying of said DC electrical current occurs from a nuclear power plant during periods of low grid electricity demand.

13. The method of claim 8, further comprising storing said hydrogen as a combustible source of energy, wherein said applying of said DC electrical current occurs from a nuclear power plant during periods of low grid electricity demand.

14. The method of claim 8, further comprising storing said oxygen.

* * * * *